US007429409B2

(12) United States Patent
Husemann

(10) Patent No.: US 7,429,409 B2
(45) Date of Patent: Sep. 30, 2008

(54) UV-CROSSLINKING BLOCK COPOLYMERS

(75) Inventor: Marc Husemann, Hamburg (DE)

(73) Assignee: tesa AG, Hamburg (DE)

( * ) Notice: Subject to any disclaimer, the term of this patent is extended or adjusted under 35 U.S.C. 154(b) by 353 days.

(21) Appl. No.: 11/120,311

(22) Filed: May 2, 2005

(65) Prior Publication Data
US 2005/0250906 A1 Nov. 10, 2005

(30) Foreign Application Priority Data
May 10, 2004 (DE) .................. 10 2004 023 637

(51) Int. Cl.
C08G 75/04 (2006.01)
C08J 7/04 (2006.01)
(52) U.S. Cl. .................. 427/516; 522/904; 522/905; 522/162; 522/35; 528/376
(58) Field of Classification Search .......... 522/35, 522/904, 905, 149, 150, 162; 427/516; 528/376
See application file for complete search history.

(56) References Cited

U.S. PATENT DOCUMENTS

| 4,144,157 | A | * | 3/1979 | Guse et al. ............ 522/151 |
| 4,851,477 | A | | 7/1989 | Hutchins et al. ....... 525/123 |
| 5,679,762 | A | | 10/1997 | Yoshida et al. ........ 528/364 |
| 6,165,563 | A | | 12/2000 | Chandran et al. ...... 427/516 |
| 6,310,175 | B1 | | 10/2001 | Kobayashi et al. ..... 528/374 |
| 6,528,595 | B1 | | 3/2003 | Chino et al. | |
| 6,586,491 | B2 | * | 7/2003 | Husemann et al. ..... 522/35 |
| 6,720,399 | B2 | | 4/2004 | Husemann et al. ..... 526/319 |
| 6,765,078 | B2 | | 7/2004 | Husemann et al. ..... 526/319 |
| 6,831,114 | B2 | | 12/2004 | Husemann et al. ..... 522/35 |
| 7,091,296 | B2 | * | 8/2006 | Meyer et al. ......... 526/319 |
| 2004/0072933 | A1 | | 4/2004 | Shustack | |
| 2004/0092685 | A1 | | 5/2004 | Husemann et al. ..... 526/217 |

FOREIGN PATENT DOCUMENTS

| DE | 100 30 217 | 1/2002 |
| DE | 100 36 801 | 2/2002 |
| DE | 101 49 077 | 4/2003 |
| DE | 101 49 084 | 6/2003 |
| EP | 0 686 653 | 12/1995 |
| EP | 1 081 205 | 3/2001 |
| EP | 10 94 086 | 4/2001 |
| JP | 63-132914 | 6/1988 |
| JP | 3-190911 | 8/1991 |
| WO | WO 03/070792 | * 8/2003 |

OTHER PUBLICATIONS

Fouassier: "Photoinitiation, Photopolymerization and Photocuring: Fundamentals and Applications", Hanser-Verlag, Munich 1995.
Carroy et al. in "Chemistry and Technology of UV and EB Formulation for Coatings, Inks and Paints", Oldring (Ed.), 1994, SITA, London.
"Handbook of Pressure Sensitive Adhesive Technology" Donatas Satas (van Nostrand, New York 1989).
T.G. Fox, Bull. Am. Phys. Soc. 1 (1956) 123.
Skelhorne, Electron Beam Processing, in Chemistry and Technology of UV and EB formulation for Coatings, Inks and Paints, vol. 1, 1991, SITA, London.
K. Matyjaszewski (ed.), Controlled/Living Radical Polymerization, ACS Symposium Series, No. 768, ACS, Washington, 2000.
G. Holden, N. R. Legge, R. P. Quirk, H. E. Schroeder (Ed.), Thermoplastic Elastomers, 2nd ed., 1996, C. Hanser Verlag, Munich.
N. Hadjichrisizichis, S. Pispar, G.A. Floudas, Block Copolymers,Wiley, N.Y.,2003.

* cited by examiner

Primary Examiner—Susan W Berman
(74) Attorney, Agent, or Firm—Norris McLaughlin & Marcus PA

(57) ABSTRACT

Process for preparing crosslinked pressure-sensitive adhesives at least partly based on block copolymers comprising at least one polyvalent thioether unit, characterized in that at least the following process steps are carried out:

two-stage or multi-stage free-radical addition polymerization of at least two copolymerizable monomers in the presence of at least one polyvalent mercaptan, at least one of the monomers being functionalized such that on irradiation with ultraviolet rays it initiates a UV crosslinking, the polymerization producing block copolymers containing at least one polyvalent thioether unit, coating of the polymer from the melt onto a backing, crosslinking of the polymer on the backing by irradiation with ultraviolet radiation.

13 Claims, No Drawings

UV-CROSSLINKING BLOCK COPOLYMERS

The invention relates to a process for preparing pressure-sensitive adhesives by means of mercaptan-regulated free-radical addition polymerization, to intermediates of the preparation process, and to pressure-sensitive adhesives prepared by the process.

BACKGROUND OF THE INVENTION

Block copolymers have already been known for a long time. They have proven themselves for a multiplicity of different applications and have become established accordingly. Thus, for example, rubbers (e.g. natural rubber or styrene-butadiene rubber) or styrene block copolymers (SIS, SBS) are used as a basis for producing self-adhesive tapes.

Numerous self-adhesive tapes comprise as an elastomer component polyacrylates, whose technology has already been known for more than 40 years. These adhesive tapes have a multiplicity of advantages over rubber-based adhesive tapes.

Their qualities include excellent UV and light stability, high resistance to thermooxidative aging, polarity adjustable in accordance with the respective requirement, and, typically, a water-clear transparency. Polyacrylate pressure-sensitive adhesives, moreover, by virtue of the possibility they generally afford, and which is generally taken advantage of, of crosslinking the polymer chains, possess high cohesion even at relatively high service temperatures, and hence their adhesive bonds possess a high temperature resistance. A further advantage is that polyacrylate pressure-sensitive adhesives are tacky as they are, i.e. without additional additives such as tackifier resins or plasticizers, for example.

In order to meet the increasing requirements imposed from industry on polyacrylate pressure-sensitive adhesives the recent past has seen the specific development of polymerization processes for controlling the molecular weight distribution (K. Matyjaszewski (ed.), Controlled/Living Radical Polymerization, ACS Symposium Series, No. 768, ACS, Washington, 2000). With such polymerization processes it is possible with advantage to utilize synthesized polyacrylates for systems including pressure-sensitive adhesives which can be coated from the melt (DE 100 30 217; DE 100 36 801; DE 101 49 084). The improvements, however, are slight.

Conventional approaches to controlling the properties of polyacrylate pressure-sensitive adhesives include the choice of the nature and amount of the comonomers employed, the adjustment of molar mass and molar mass distribution of the polymers, and the nature and extent of the crosslinking of the polymers. The aforementioned variables allow targeted and precise control of the profile of adhesive properties.

Another path to improved products is that of the targeted synthesis of block copolymers (N. Hadjichriszichis, S. Pispar, G. A. Floudas, Block Copolymers, Wiley, N.Y., 2003). As a result of chemical coupling of thermodynamically incompatible polymer blocks such block copolymers exhibit microphase separation: that is, thermodynamically compatible polymer blocks associate, whereas thermodynamically incompatible blocks segregate into spatially separate regions, but without any macroscopic phase separation occurring. This results, depending on composition, in phases differing in structure. Block copolymers currently utilized in pressure-sensitive adhesives typically possess two or more polymer blocks having a high softening temperature (also referred to as hard block below; realized by means of a correspondingly high glass transition temperature or a correspondingly high crystallite melting temperature) and at least one block of low softening temperature (also referred to below as soft block). The composition in systems employed to date has been chosen such that the phase formed by the soft blocks constitutes a continuous matrix within the pressure-sensitive adhesive, which is the prerequisite for the pressure-sensitive adhesion properties. The polymer blocks which soften at a high temperature associate or segregate to form phase regions (domains) which are typically approximately globular, which are present in dispersion in the continuous matrix of the soft phase, and which below their glass transition temperature or crystallite melting temperature function as physical crosslinking points (G. Holden, N. R. Legge, R. P. Quirk, H. E. Schroeder (Ed.), Thermoplastic Elastomers, 2nd ed., 1996, C. Hanser Verlag, Munich). Advantages of pressure-sensitive adhesives based on such block copolymers include, for example, the possibility of realizing very high shear strengths.

The melt coatability of the systems, however, is poor, owing to the pronounced phase separation described above. Therefore further developments were undertaken in order to improve the melting readiness of block copolymers. One route taken, for example, is that of the star polymers, as they are known, which owing to their three-dimensionally branched structure have a lower flow viscosity than linear systems of equal molar mass. Many of these block copolymers have already been described. Examples can be found in Japanese Official Patent Provisional Publication (Kokai) No. Showa 63-132914, in Japanese Official Patent Provisional Publication (Kokai) No. Heisei 3-190911 or in Japanese Patent Publication (Kohyo) No. Heisei 5-500827. Another approach has been described in EP 0 686 653. It gives a description of polyvalent mercaptans as connecting elements in star-shaped block copolymers. These materials can be coated very efficiently from the melt. A general disadvantage of these systems, however, is the relatively poor solvent resistance, since the network present is only a physical one.

It is an object of the invention to provide block copolymers which can be coated easily, in other words at low temperatures, but which can then be crosslinked so that the crosslinked products can be used as pressure-sensitive adhesives (PSAs). In the course of the coating operation decomposition processes ought largely to be avoided. The block copolymers ought advantageously to be coatable free from orientation.

A further object of the invention is to offer a process for preparing pressure-sensitive adhesives based on such block copolymers.

In particular it could not have been expected that block copolymers of the type specified below would be coatable easily, i.e. at low, gentle temperatures, and yet after an operation of crosslinking by UV radiation would have the shear strengths desired for PSAs.

SUMMARY OF THE INVENTION

The invention accordingly provides a process for preparing crosslinked pressure-sensitive adhesives at least partly based on block copolymers comprising at least one polyvalent thioether unit, in which at least the following process steps are carried out:

two-stage or multi-stage free-radical addition polymerization of at least two copolymerizable monomers in the presence of at least one polyvalent mercaptan, at least one of the monomers being functionalized such that on irradiation with ultraviolet rays it initiates a UV crosslinking, the polymerization producing block copolymers containing at least one polyvalent thioether unit, coating of the polymer from the melt onto a permanent or temporary backing, crosslinking of the polymer on the backing by irradiation with ultraviolet radiation.

DETAILED DESCRIPTION

The polyvalent thioether unit is in particular a building block containing at least two thio units —S—, the valency corresponding at least to the number of thioether units. Polyvalent thioether units can be constructed with particular preference from a "central" linking unit X, for example in the form of aliphatic or aromatic hydrocarbon building blocks, to which the corresponding number of sulphur atoms are attached. In at least some of the thio units the second bond of each thereof then serves for the attachment of (co)polymer building blocks.

If the second bond of at least some of the thio units is occupied by hydrogen, then the species present are the corresponding polyvalent mercaptans.

The polyvalent mercaptan is therefore a compound which carries two or more mercaptan groups per molecule. Thus, for example, polyvalent mercaptans having two mercaptan groups are referred to as divalent mercaptans and those having three mercaptan groups as trivalent mercaptans.

Very advantageous examples of polyvalent mercaptans include the following: diesters of diols, such as ethylene glycol and 1,4-butanediol, carboxyl-containing mercaptans, polyesters having three or more hydroxyl groups, such as trimethylolpropane, pentaerythritol, dipentaerythritol, compounds containing three or more mercapto groups, such as trithioglycerol, triazine polythiols, such as 2-di-n-butylamino-4,6-dimercapto-s-triazine and 2,4,6-trimercapto-s-triazine, compounds consisting of a reaction product of hydrogen sulphide and two or more epoxy groups from polyvalent epoxides, and esters of polyvalent carboxylic acids where the carboxylic groups have been transesterified accordingly, with mercaptoethanol or similar compounds, for example.

The abovementioned compounds can be used for the polymerization alone or in conjunction with one another. The polymerization is regulated via the polyvalent mercaptan groups, with the use of compounds having from 3 to 6 mercaptan groups being preferred.

Examples of trivalent mercaptans are: trithioglycerol, trimethylolpropane tristhioglycolate and trimethylolpropane tristhiopropionate Examples of tertavalent mercaptans are: pentaerythritol tetrakisthioglycolate and penta-erythritol tetrakisthiopropionate.

Examples of hexavalent mercaptans are: dipentaerythritol hexakisthioglycolate and dipentaerythritol hexakisthiopropionate.

For the preparation of the PSAs first of all block copolymers are prepared as an intermediate. These copolymers are prepared advantageously by way of conventional free-radical addition polymerizations. In order to initiate the radical-mechanism polymerizations it is preferred to use radical initiator systems which include azo or peroxo initiators which form radicals—in particular, which decompose thermally. Suitable in principle are all customary initiators which are familiar to the person skilled in the art for vinyl compounds. The production of C-centred radicals is described in Houben Weyl, Methoden der Organischen Chemie, Vol. E 19a, pp. 60-147. These methods are preferentially employed analogously.

Examples of radical sources are peroxides, hydroperoxides and azo compounds; a number of (non-exclusive) examples of typical radical initiators which can be used here include the following: potassium peroxodisulphate, dibenzoyl peroxide, cumene hydroperoxide, cyclohexanone peroxide, di-t-butyl peroxide, azodiisobutyronitrile, cyclo-hexylsulphonyl acetyl peroxide, diisopropyl percarbonate, t-butyl peroctoate, benzpinacol. As radical initiator it is very preferred to use 1,1'-azo-bis-(cyclohexanecarbonitrile) (Vazo 88™ from DuPont) or azodiisobutyronitrile (AIBN).

In accordance with the invention the block copolymers are prepared in an at least 2-stage operation. In a first step the polyvalent mercaptan is mixed with one or more first monomers A and, optionally, with second monomers C. Thereafter the radical polymerization is initiated in the presence of the polyvalent mercaptan.

Upon completion of the first polymerization third monomers B and, optionally, second monomers C are added. Then polymerization is again carried out, of the monomers B and, where used, C in the second step. The 2-stage operation can run continuously, or else can be interrupted after the first step and reinitiated by further addition of initiators (in particular the thermal initiators mentioned above).

The polymerization can be carried out in bulk, in the presence of one or more organic solvents, in the presence of water or in mixtures of organic solvents and water. The aim is to minimize the amount of solvent used. Suitable organic solvents are plain alkanes (e.g. hexane, heptane, octane, isooctane), aromatic hydrocarbons (e.g. benzene, toluene, xylene), esters (e.g. ethyl acetate, propyl, butyl or hexyl acetate), halogenated hydrocarbons (e.g. chlorobenzene), alkanols (e.g. methanol, ethanol, ethylene glycol, ethylene glycol monomethyl ether) and ethers (e.g. diethyl ether, dibutyl ether) or mixtures thereof. A water-miscible or hydrophilic cosolvent can be added to the aqueous polymerization reactions in order to ensure that the reaction mixture is in the form of a homogeneous phase during monomer conversion. Cosolvents which can be used with advantage for the present invention are selected from the group consisting of aliphatic alcohols, glycols, ethers, glycol ethers, pyrrolidines, N-alkylpyrrolidinones, N-alkyl-pyrrolidones, polyethylene glycols, polypropylene glycols, amides, carboxylic acids and salts thereof, esters, organosulphides, sulphoxides, sulphones, alcohol derivatives, hydroxy ether derivatives, amino alcohols, ketones and the like, and also derivatives and mixtures thereof.

The polymerization time chosen per polymerization step is advantageously between 4 and 72 hours, depending on conversion and temperature. The higher the level at which the reaction temperature can be chosen, in other words the higher the thermal stability of the reaction mixture, the lower the reaction time that can be chosen.

For initiating the polymerization it is essential, for the initiators which decompose thermally, that heat be introduced. For the thermally decomposing initiators the polymerization can be initiated by heating at from 50 to 160° C., depending on initiator type.

In the case of the block copolymers obtainable by 2-stage or multi-stage free-radical addition polymerization of at least two copolymerizable monomers in the presence of at least one polyvalent mercaptan at least one of the monomers is functionalized such that on irradiation with ultraviolet rays it initiates UV crosslinking.

The block copolymers can be represented in particular by the general structural formula

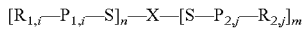

where i is a serial number from 1 to n and j is a serial number from 1 to m, and n and m are each integers, where $P_{1,i}$ are polymer segments from a monomer group comprising first monomers A and/or copolymer segments from a monomer group comprising first monomers A and third monomers C, where the i segments $P_1$ can have different lengths and different chemical compositions, where $P_{2,j}$ are polymer segments from a monomer group comprising second monomers B and/or copolymer segments from a monomer group comprising second monomers B and third monomers C, where the j segments $P_2$ can have different lengths and different chemical compositions, with the proviso that at least one of the segments $P_{1,i}$ and/or $P_{2,j}$ contains copolymerized monomers C, $R_{1,j}$ and $R_{2,j}$ are radicals capping the segments $P_{1,i}$ and $P_{2,j}$, where additionally X is a linking unit, with $X(S)_{n+m}$ being a polyvalent thioether unit, the valency being at least n+m, characterized in that the monomers C contain the functional groups which on irradiation with ultraviolet rays initiate a UV crosslinking.

The weight-average molecular weight $M_w$ of the block copolymers is preferably between 2000 and 4 000 000, in particular between 20 000 and 1 000 000, very particularly between 50 000 and 500 000.

The radicals R may be formed in particular by monomers or fragments thereof, initiators or fragments thereof, further polymer blocks or further thio groups. The thio groups can in this case constitute the sites of linkage to further building blocks of the structural formula set out above.

The segments are referred to below also as polymer blocks. The segments $P_{1,i}$ may in particular be homopolymer segments P(A) of the monomers A and/or copolymer segments P(A/C) of the monomers A and C; the segments $P_{2,j}$ are advantageously in particular homopolymer segments P(B) and/or copolymer segments P(B/C).

The polymer segments $P_{1,i}$ and/or $P_{2,j}$ possess in each case preferably an average molecular weight $M_w$ of from 1000 to 2 000 000 g/mol, more preferably an average molecular weight $M_w$ of from 10 000 to 500 000 g/mol.

P(A/C) and P(A) differ in their chemical composition from P(B/C) and P(B). The differences are obtained through the use of different monomers A and B or through different monomer mixtures A and B employed.

Examples of different compositions are given by:
a) polymer segments having different glass transition temperatures or softening temperatures
b) polymer segments having different compatibility
c) polymer segments consisting of polymers having different solubilities.

Advantageously the polymer blocks $P_{1,i}$ and $P_{2,j}$ are not homogeneously miscible with one another at room temperature RT.

The non-crosslinked polymerization products advantageously have at least two glass transition temperatures, of which at least one is not higher than +15° C., and which differ from one another by at least 15° C. (Statements of the glass transition temperatures in this text are based on the measurement from the solvent-free system: that is, at a solvent content of not more than 1% by weight; thus, where appropriate, after concentration.)

In a preferred way (/1/) the polymer segments P(A) and/or P(A/C) and P(B) and/or P(B/C) are chosen such that
the polymer blocks P(A) and/or P(A/C) have a softening temperature in the range from +20° C. to +175° C.,
the polymer blocks P(B) and/or P(B/C) have a softening temperature in the range from −130° C. to +10° C., and
the polymer blocks P(A) and P(A/C) are not homogeneously miscible with P(B) and P(B/C) at room temperature, and/or
the polymer blocks P(A) and P(B/C) are not homogeneously miscible with P(B) and P(A/C) at room temperature.

By softening temperature in this context is meant the glass transition temperature in the case of amorphous systems and the melting temperature in the case of semi-crystalline polymers. Glass transition temperatures are stated as results from quasi-static processes such as differential scanning calorimetry (DSC), for example.

Sometimes in the text below the polymer blocks P(A) and P(A/C) are referred to as "hard blocks" and the polymer blocks P(B) and P(B/C) as "elastomer blocks".

In another preferred way of proceeding (/2/) the polymer segments P(A) and/or P(A/C) and P(B) and/or P(B/C) are chosen such that
the polymer blocks P(A) and/or P(A/C) have a softening temperature in the range from −130° C. to +25° C.,
the polymer blocks P(B) and/or P(B/C) have a softening temperature in the range from −130° C. to +25° C., and
the polymer blocks P(A) and P(A/C) are not homogeneously miscible with P(B) and P(B/C) at room temperature, and/or
the polymer blocks P(A) and P(B/C) are not homogeneously miscible with P(B) and P(A/C) at room temperature.

In another preferred way of proceeding (/3/) the polymer segments P(A) and/or P(A/C) and P(B) and/or P(B/C) are chosen such that
the polymer blocks P(A) and/or P(A/C) have a softening temperature in the range from 10° C. to +175° C.,
the polymer blocks P(B) and/or P(B/C) have a softening temperature in the range from 10° C. to +175° C., and
the polymer blocks P(A) and P(A/C) are not homogeneously miscible with P(B) and P(B/C), and/or
the polymer blocks P(A) and P(B/C) are not homogeneously miscible with P(B) and P(A/C).

Where the polymer blocks P(B) and/or P(B/C) have a softening temperature in the range from −130° C. to +10° C. it is advantageous to use acrylic monomers as monomers B for the blocks P(B) and (P(B/C), respectively. For this purpose it is possible in principle to use any acrylic compounds which are familiar to the person skilled in the art and which are suitable for the synthesis of polymers. Preference is given to choosing those monomers B which result in the polymer blocks P(B) and/or P(B/C), alone or in combination with one or more further monomers, having glass transition temperatures of less than +10° C. Accordingly the vinyl monomers may be chosen with preference.

For preparing the polymer blocks P(B) and/or P(B/C) it is then advantageous to use from 75 to 100% by weight of acrylic and/or methacrylic acid derivatives of the general structure

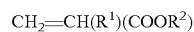           (-I-)

where $R^1$=H or $CH_3$ and $R^2$=H or linear, branched or cyclic, saturated or unsaturated alkyl radicals having 1 to 30, in particular having 4 to 18, carbon atoms, and/or up to 25% by weight of vinyl compounds (-II-), which advantageously contain functional groups.

Acrylic monomers used with very great preference in the sense of the compound (-I-) as components for polymer blocks P(B) or P(B/C) include acrylic and methacrylic esters with alkyl groups consisting of 4 to 18 carbon atoms. Specific examples of such compounds, without wishing to be restricted by this enumeration, include n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, the branched isomers thereof, such as 2-ethylhexyl acrylate and isooctyl acrylate, and also cyclic monomers, such as cyclohexyl acrylate or norbornyl acrylate and Isobornyl acrylate, for example.

Additionally vinyl monomers from the following groups can be used optionally as monomers in the sense of definition (-II-) for polymer blocks P(B) and P(B/C), respectively: vinyl esters, vinyl ethers, vinyl halides, vinylidene halides, and vinyl compounds containing aromatic rings and heterocycles in a position. Here again, selected monomers which can be used in accordance with the invention may be mentioned by way of example: vinyl acetate, vinylformamide, vinylpyridine, ethyl vinyl ether, 2-ethylhexyl vinyl ether, butyl vinyl ether, vinyl chloride, vinylidene chloride and acrylonitrile.

Further suitable, particularly preferred examples of vinyl-containing monomers in the sense of definition (-II-) for soft blocks P(B) and/or P(B/C) are hydroxyethyl acrylate, hydroxypropyl acrylate, hydroxyethyl methacrylate, hydroxypropyl methacrylate, N-methylolacrylamide, acrylic acid, methacrylic acid, allyl alcohol, maleic anhydride, itaconic anhydride, itaconic acid, acrylamide and glycidyl methacrylate, to name but a few.

In one preferred embodiment of the inventive systems one or more of the polymer blocks P(A) and/or P(A/C) and P(B) and/or P(B/C) contains one or more grafted-on side chains. There is no restriction here as to whether such systems are obtained by a graft-from process (polymerizational attachment of a side chain starting from an existing polymer backbone) or by a graft-to process (attachment of polymer chains to a polymer backbone by way of polymer-analogous reactions).

In particular for the preparation of such block copolymers it is possible as monomers B to use monomers functionalized in such a way as to allow a graft-from process for the graft attachment of side chains. Mention may be made here in particular of acrylic and methacrylic monomers which carry halogen functionalization or any other functional groups which permit, for example, an ATRP (Atom Transfer Radical Polymerization) process. In this context mention may also be made of the possibility of introducing side chains into the polymer chains in a targeted manner by way of macromonomers. The macromonomers may in turn be constructed accordingly.

In one advantageous implementation of this invention the polymer blocks P(A) and/or P(A/C) and P(B) and/or P(B/C) contain installed therein one or more functional groups which allow radiation-chemical crosslinking of the polymer blocks, in particular by means of UV irradiation or by irradiation with electrons (electron beam curing). With this objective, monomer units which can be used include in particular acrylic esters which contain an unsaturated alkyl radical having 3 to 18 carbon atoms and containing at least one carbon-carbon double bond. For acrylates modified with double bonds, allyl acrylate and acrylated cinnamates are suitable with particular advantage. Besides acrylic monomers, vinyl compounds with double bonds which are not reactive during the (free-radical) additional polymerization of the polymer block P(B) and/or P(B/C) can be used with very great advantage as monomers for the polymer block P(B) and/or P(B/C), respectively. Particularly preferred examples of such comonomers are isoprene and/or butadiene, but also chloroprene.

Where the polymer blocks P(A) and/or P(A/C) have a softening temperature in the range from 10° C. to +175° C. the starting monomers A for the polymer blocks P(A) and/or P(A/C) are preferably selected such that the resulting polymer blocks P(A) and/or P(A/C) are not miscible with the polymer blocks P(B) and/or P(B/C) and, accordingly, microphase separation occurs. Advantageous examples of compounds used as monomers A are vinylaromatics, such as styrene, which may also be alkylated, methyl methacrylates, such as cyclohexyl methacrylate and isobornyl methacrylate, and acrylates, such as isobornyl acrylate, for example. Further examples include vinyl compounds having aromatic nuclei of $C_4$ to $C_{18}$ which may also contain heteroatoms. Particularly preferred examples are 4-vinylpyridine, N-vinylphthalimide, methylstyrene, 3,4-dimethoxystyrene, 4-vinyl benzoic acid, benzyl acrylate, benzyl methacrylate, phenyl acrylate, phenyl methacrylate, t-butylphenyl acrylate, t-butylphenyl methacrylate, 4-biphenylyl acrylate and methacrylate, 2-naphthyl acrylate and methacrylate, and mixtures of those monomers, this enumeration not being exhaustive.

Particularly preferred examples are methyl methacrylate and styrene.

Alternatively the polymer blocks P(A) and/or P(A/C) may be constructed as a copolymer which may be composed of at least 60% of the above monomers A, leading to a high softening temperature, or of a mixture of these monomers, but containing up to 40% of monomers B, as defined above, which lead to a lowering of the softening temperature of the polymer block P(A) and/or P(A/C). In this sense mention may be made by way of example, but not exclusively, of alkyl acrylates, which are defined in accordance with the information given in relation to the monomers B.

In a further advantageous way of proceeding, the polymer blocks P(A) and/or P(A/C) and/or P(B) and/or P(B/C) are functionalized such that thermally initiated crosslinking can be carried out. The (thermal) crosslinkers which can be chosen advantageously include the following: epoxides, aziridines, isocyanates, polycarbodiimides and metal chelates, to name but a few.

Where the polymer blocks P(B) and/or P(B/C) have a softening temperature in the range from 10° C. to +175° C. the starting monomers B for the polymer blocks P(B) and/or P(B/C) are preferably selected such that the resulting polymer blocks P(B) and/or P(B/C) are not miscible with the polymer blocks P(A) and/or P(A/C) and, accordingly, microphase separation (at room temperature) occurs. Advantageous examples of compounds used as monomers B are vinylaromatics, such as styrene, which may also be alkylated, methyl methacrylates, such as cyclohexyl methacrylate and isobornyl methacrylate, and acrylates, such as isobornyl acrylate, for example. Further examples include vinyl compounds having aromatic nuclei of $C_4$ to $C_{18}$ which may also contain heteroatoms. Particularly preferred examples are 4-vinylpyridine, N-vinylphthalimide, methylstyrene, 3,4-dimethoxystyrene, 4-vinyl benzoic acid, benzyl acrylate, benzyl methacrylate, phenyl acrylate, phenyl methacrylate, t-butylphenyl acrylate, t-butylphenyl methacrylate, 4-biphenylyl acrylate and methacrylate, 2-naphthyl acrylate and methacrylate, and mixtures of those monomers, this enumeration not being exhaustive.

Where the polymer blocks P(A) and/or P(A/C) have a softening temperature in the range from −130° C. to +25° C. it is advantageous to use acrylic monomers for the blocks P(A) and P(A/C), respectively. For this purpose it is possible in principle to use any acrylic compounds which are familiar to the person skilled in the art and which are suitable for the synthesis of polymers. Preference is given to choosing those monomers which result in the polymer blocks P(A) and/or P(A/C), alone or in combination with one or more further monomers, having glass transition temperatures of less than +25° C. Accordingly the vinyl monomers may be chosen with preference.

For preparing the polymer blocks P(A) and/or P(A/C) it is then advantageous to use from 75 to 100% by weight of acrylic and/or methacrylic acid derivatives as defined above in the case of the general structure -I- where $R^1$=H or $CH_3$ and $R^2$=H or linear, branched or cyclic, saturated or unsaturated alkyl radicals having 1 to 30, in particular having 4 to 18, carbon atoms, and/or up to 25% by weight of vinyl compounds, likewise as defined for -II-, which advantageously contain functional groups.

Acrylic monomers used with very great preference in the sense of the compound -I- as components for polymer blocks P(A) or P(A/C) include acrylic and methacrylic esters with alkyl groups consisting of 4 to 18 carbon atoms. Specific examples of such compounds, without wishing to be restricted by this enumeration, include n-butyl acrylate, n-pentyl acrylate, n-hexyl acrylate, n-heptyl acrylate, n-octyl acrylate, n-nonyl acrylate, lauryl acrylate, stearyl acrylate, stearyl methacrylate, the branched isomers thereof, such as 2-ethylhexyl acrylate and isooctyl acrylate, and also cyclic monomers, such as cyclohexyl acrylate or norbornyl acrylate and isobornyl acrylate, for example.

Additionally vinyl monomers from the following groups can be used optionally as monomers in the sense of definition -II- for polymer blocks P(A) and/or P(A/C): vinyl esters, vinyl ethers, vinyl halides, vinylidene halides, and vinyl compounds containing aromatic rings and heterocycles in a position. Here again, selected monomers which can be used in accordance with the invention may be mentioned by way of example: vinyl acetate, vinylformamide, vinylpyridine, ethyl vinyl ether, 2-ethylhexyl vinyl ether, butyl vinyl ether, vinyl chloride, vinylidene chloride and acrylonitrile.

Further suitable, particularly preferred examples of vinyl-containing monomers according to the definition for -II- for the softblocks P(A) and/or P(A/C) are hydroxyethylacrylate, hydroxypropyl acrylate, hydroxyethyl methacrylate, hydroxypropyl methacrylate, N-methylolacrylamide, acrylic acid, methacrylic acid, allyl alcohol, maleic anhydride, itaconic anhydride, itaconic acid, acrylamide and glycidyl methacrylate, to name but a few.

Monomers C used generally, in one very preferred version, are photoinitiators having a copolymerizable double bond. Outstandingly suitable photoinitiators are those of the Norrish I and/or of the Norrish II type. The Norrish type I reaction is a photo fragmentation (α cleavage); the Norrish type II reaction is an intramolecular variant of the hydrogen abstraction reactions such as occur diversely in the case of photochemical reactions. Examples of corresponding photoinitiators are benzoin acrylate and an acrylated benzophenone from UCB (Ebecryl P 36®).

In principle it is possible to copolymerize any photoinitiators which are known to the person skilled in the art, which are able to crosslink the polymer by a radical mechanism under UV irradiation, and which have functional centres suitable for copolymerization. An overview of possible photoinitiators which can be used, and which in particular can be functionalized with a double bond, is given in Fouassier: "Photoinitiation, Photopolymerization and Photocuring: Fundamentals and Applications", Hanser-Verlag, Munich 1995. For further details Carroy et al. in "Chemistry and Technology of UV and EB Formulation for Coatings, Inks and Paints", Oldring (Ed.), 1994, SITA, London can be consulted. The photoinitiators specified therein are explicitly part of the disclosure content of this specification.

Examples of UV-photoactive groups are benzophenone-, acetophenone-, benzyl-, benzoin-, hydroxyalkylphenone-phenyl cyclohexyl ketone, anthraquinone-, trimethyl-benzoylphosphine oxide-, methylthiophenyl morpholinyl ketones, amino ketone-, azobenzoin-, thioxanthone-, hexaarylbisimidazoles, triazine-, or fluorenone, it being possible for each group to carry additional functionalities, such as halogens, amino groups or hydroxyl groups, for example.

The fraction of the polymer blocks P(A) and/or P(A/C) as a proportion of the respective block copolymer is advantageously between 5 and 49 percent by weight, preferably between 7.5 and 35 percent by weight, with particular preference between 10 and 30 percent by weight.

For further processing of the block copolymers of the invention to the PSA the monomers A and B respectively are chosen such that the resulting polymers at room temperature or higher temperatures have pressure-sensitive adhesion properties, in particular in accordance with the "Handbook of Pressure Sensitive Adhesive Technology" by Donatas Satas (van Nostrand, New York 1989). For further processing of the inventive block copolymers to thermoplastics made tough and elastic the monomers A and B respectively are chosen such that the resulting polymers at room temperature or higher temperatures possess no initial tack.

In order to obtain preferred glass transition temperatures $T_g$ of the polymers the monomers, in accordance with the remarks made above, are very preferably selected in such a way, and the quantitative composition of the monomer mixture is advantageously chosen in such a way, that the Fox equation (G1) (cf. T. G. Fox, Bull. Am. Phys. Soc. 1 (1956) 123) gives the desired $T_g$ value for the polymer.

$$\frac{1}{T_g} = \sum_n \frac{w_n}{T_{g,n}} \tag{G1}$$

In this equation n represents the serial number of the monomers used, $w_n$ the mass fraction of the respective monomer n, in percent by weight, and $T_{g,n}$ the respective glass transition temperature of the homopolymer of each of the monomers n, in K.

The polymerization in the first step can be taken to different conversions. In one preferred version a conversion of more than 50%, more preferably of more than 80%, is achieved in the first polymerization step. In the second polymerization step a conversion of more than 95% is preferably achieved.

To develop the block copolymers of the invention further they can be admixed with resins. Tackifying resins which can be added include without exception all known tackifier resins and all those described in the literature. Representatives that may be mentioned include the pinene resins, indene resins and rosins, their disproportionated, hydrogenated, polymerized and esterified derivatives and salts, the aliphatic and aromatic hydrocarbon resins, terpene resins and terpene-phenolic resins, and C5, C9 and other hydrocarbon resins. Any desired combinations of these and further resins can be used in order to adjust the properties of the resulting adhesive in accordance with what is desired. Generally speaking it is possible to use any resins which are compatible with (soluble in) the corresponding block copolymer; reference may be made in particular to all aliphatic, aromatic and alkyl aromatic hydrocarbon resins, hydrocarbon resins based on single monomers, hydrogenated hydrocarbon resins, functional hydrocarbon resins and natural resins. Express reference may be made to the depiction of the state of the art in the "Handbook of Pressure Sensitive Adhesive Technology" by Donatas Satas (van Nostrand, 1989).

A further, optional possibility is to add plasticizers, fillers, (e.g. fibres, carbon black, zinc oxide, titanium oxide, chalk, solid or hollow glass beads, microbeads made of other materials, silica, silicates), nucleators, expandants, compounding agents and/or ageing inhibitors, in the form of primary and secondary antioxidants or in the form of light stabilizers, for example.

Additionally it is possible to admix crosslinkers and crosslinking promoters. Examples of suitable crosslinkers for UV crosslinking are difunctional or polyfunctional acrylates and methacrylates.

For crosslinking with UV light it is additionally possible to add UV-absorbing photoinitiators to the inventive block copolymers. Useful photoinitiators whose use is very effective include benzoin ethers, such as benzoin methyl ether and benzoin isopropyl ether, substituted acetophenones, such as 2,2-diethoxyacetophenone (available as Irgacure 651® from Ciba Geigy), 2,2-dimethoxy-2-phenyl-1-phenylethanone, dimethoxy-hydroxyacetophenone, substituted α-ketols, such as 2-methoxy-2-hydroxy-propiophenone, aromatic sulphonyl chlorides, such as 2-naphthylsulphonyl chloride, and photoactive oximes, such as 1-phenyl-1,2-propanedione 2-(O-ethoxycarbonyl) oxime, for example.

The abovementioned photoinitiators and further photoinitiators which can be used, and other of the Norrish I or Norrish II type, may contain the following radicals: benzo-phenone-, acetophenone-, benzyl-, benzoin-, hydroxyalkylphenon-, phenyl cyclohexyl ketone-, anthraquinone-, trimethylbenzoylphosphine oxide-, methylthiophenyl morpholinyl ketone-, amino ketone-, azobenzoin-, thioxanthone-, hexaarylbisimidazole-, triazine-, or fluorenone, it being possible for each of these radicals to be additionally substituted by one or more halogen atoms and/or one or more alkyloxy groups and/or one or more amino groups or hydroxyl groups. A representative overview is given by Fouassier, "Photoinitiation, Photopolymerization and Photocuring: Fundamentals and Applications", Hanser-Verlag, Munich 1995. For further details reference may be made to Carroy et al. in "Chemistry and Technology of UV and EB Formulation for Coatings, Inks and Paints", Oldring (Ed.), 1994, SITA, London.

For producing PSA tapes the polymers described above are coated preferably as hotmelt systems. For the production process it may therefore be necessary to remove the solvent from the PSA. In one advantageous version of the process of the invention, therefore, there is at least one concentration step between polymerization and coating from the melt.

It is possible in principle to use all of the methods known to the skilled worker. One very preferred method is that of concentration using a single-screw or twin-screw extruder. The twin-screw extruder can be operated with the screws rotating in the same or opposite directions. The solvent or water is distilled off preferably over a number of vacuum stages. Moreover, compensatory heating is applied depending on the distillation temperature of the solvent. The residual solvent fractions amount to preferably <1%, more preferably <0.5% and very preferably <0.2%. The hotmelt is processed further from the melt.

For coating as a hotmelt a variety of coating methods may be employed. Coating may take place onto either a permanent or a temporary backing.

In one preferred version the block copolymers are coated by a roll coating method. Various roll coating methods are described in the "Handbook of Pressure Sensitive Adhesive Technology" by Donatas Satas (van Nostrand, New York 1989). In another version coating takes place using a melt die. In this case a distinction can be made between the contact method and the contactless method. The film can in this case be produced either by the die design within the coating die or else by a drawing operation downstream of the die outlet.

Another preferred process operates with extrusion coating. Extrusion coating is preferably performed using an extrusion die. The extrusion dies used may come from one of the following three categories: T-dies, fishtail dies and coathanger dies. The individual types differ in the design of their flow channel. The film of PSA to be coated is produced by the shape of the extrusion die.

In one preferred version coating takes place with a coathanger die onto a backing, specifically in such a way that a movement of die relative to backing forms a layer of PSA on the backing.

In one preferred version coating takes place directly onto a backing material. Suitable backing materials include in principle all those materials known to the person skilled in the art, such as BOPP, PET, nonwoven, PVC, foam or release papers (glassine, HDPE, LDPE), for example.

Advantageously coating is carried out at temperatures of not more than 200° C.

After the coating operation the polymer on the (permanent or temporary) backing is crosslinked by irradiation with ultraviolet light.

For UV crosslinking irradiation takes place using ultraviolet radiation in a wavelength range from 200 to 400 nm (advantageously adjusted in accordance with the UV photoinitiator used) for a short time, using in particular high-pressure or medium-pressure mercury lamps with an output of from 80 to 240 W/cm. The intensity of irradiation is tailored to the particular quantum yield of the UV photoinitiator, to the degree of crosslinking which is to be established, and to establish the degree of orientation.

A further possibility is to crosslink the inventive block copolymers additionally using electron beams. Typical irradiation equipment which can be employed comprises linear cathode systems, scanner systems or segmented cathode systems, where the equipment in question comprises electron beam accelerators. An exhaustive description of the state of the art and the most important process parameters can be found in Skelhorne, Electron Beam Processing, in Chemistry and Technology of UV and EB formulation for Coatings, Inks and Paints, Vol. 1, 1991, SITA, London. The typical acceleration voltages are in the range between 50 kV and 500 kV, preferably 80 kV and 300 kV. The scatter doses employed range between 5 to 150 kGy, in particular between 20 and 100 kGy.

The invention likewise provides block copolymers obtainable as intermediates in the process described above.

The invention further provides pressure-sensitive adhesives obtainable by the process described above, especially those based at least partly on the block copolymers as described above.

The crosslinked pressure-sensitive adhesives very preferably have shear strengths of at least 200 minutes at 23° C., measured in accordance with test D, which is described below.

The invention affords the unforeseeable advantages of being able to use outstandingly coatable, block-copolymer-based polymers—having softening temperatures within gentle temperature ranges, in other words in temperature ranges in which no decomposition of the polymer takes place—for pressure-sensitive adhesives, since after coating and subsequent crosslinking very good shear strength properties can be obtained. At the same time the invention offers the possibility for orientation-free coating, in contra-distinction to block-copolymer-based pressure-sensitive adhesives of the prior art.

Experiments

Test Methods

Get Permeation Chromatography (GPC) (Test A)

The average molecular weights $M_n$ (numerical average) and $M_w$ (weight average) and the polydispersity D were determined by gel permeation chromatography. The eluent used was THF with 0.1% by volume trifluoroacetic acid. Measurement took place at 25° C. The precolumn used was PSS-SDV, 5μ, $10^3$ Å, ID 8.0 mm×50 mm. Separation was effected using the columns PSS-SDV, 5μ, $10^3$ and $10^5$ and $10^6$ each of ID 8.0 mm×300 mm. The sample concentration was 4 g/l, the flow rate 1.0 ml per minute. Measurement was made against polystyrene standards.

Differential Thermocalorimetry (DSC) (Test B)

The measurements were carried out using a dynamic power compensation differential calorimeter from Mettler Toledo. Measurement took place in a temperature range from −150° C. to 180° C. The heating rate is 10° C./min. Two heating curves were recorded in each case, the second heating curve being that used for determining the glass transition temperature. The onset glass transition temperature was determined.

180° Bond Strength Test (Test C)

The bond strength was determined in accordance with PSTC-101. A strip 20 mm wide of a PSA coated onto siliconized release paper was transferred by lamination to a Saran-primed PET film 25 μm thick, and the resulting PSA tape specimen was then applied to a steel plate. The steel plates were washed beforehand twice with acetone and once with isopropanol. The PSA strip was pressed onto the substrate twice using a 2 kg weight. The adhesive tape was thereafter removed from the substrate immediately at 30 mm/min and at an angle of 180°. The results are stated in N/cm and represent the mean value from three individual measurements. All measurements were conducted at room temperature under controlled-climate conditions.

Shear Stability Times (Test D)

The test was carried out in accordance with PSTC-7. A PSA layer 50 μm thick is applied to a PET film 25 μm thick. A strip of this specimen 1.3 cm wide is bonded over a length of 2 cm to a polished steel plaque, bonding being effected by rolling back and forward over the bond three times using a 2 kg roller. The plaques are equilibrated for 30 minutes under test conditions (temperature and humidity) but without a load. The test weight is then hung on, thereby producing a shear stress parallel to the bond area, and a record is made of the time which elapses before the bond fails. If a holding time of 10 000 minutes is reached, the test is discontinued before the adhesive bond fails.

Determination of the Gel Fraction (Test E)

After careful drying, solvent-free specimens of adhesive are welded into a pouch made of polyethylene nonwoven (Tyvek web). The gel value is determined from the difference in the sample weights before and after extraction with toluene.

I claim:

1. Process for preparing crosslinked pressure-sensitive adhesives at least partly based on block copolymers comprising at least one polyvalent thioether unit, wherein at least the following process steps are carried out:
    two-stage or multi-stage free-radical addition polymerization of at least two copolymerizable monomers in the presence of at least one polyvalent mercaptan, at least one of the monomers comprising a functional group which on irradiation with ultraviolet rays initiates an ultraviolet (UV) crosslinking,
    the polymerization producing block copolymers containing at least one polyvalent thioether unit and having, in the uncrosslinked state, at least two glass transition temperatures, of which at least one is not higher than +15° C., and which differ from one another by at least 15° C.,
    coating of the polymer from the melt onto a backing at a temperature of not more than 200° C.,
    crosslinking of the polymer on the backing by irradiation with ultraviolet radiation.

2. Process according to claim 1, wherein the crosslinked pressure-sensitive adhesives have a shear strength of at least 200 minutes at 23° C., measured in accordance with test D.

3. Process according to claim 1, comprising at least one concentration step between the polymerization and the coating from the melt.

4. Pressure-sensitive adhesive obtained by the process of claim 1.

5. Block copolymers obtained by two-stage or multi-stage free-radical addition polymerization of at least two copolymerizable monomers in the presence of at least one polyvalent mercaptan, wherein at least one of the monomers comprises a functional group which on irradiation with ultraviolet rays initiates a UV crosslinking and wherein the non-crosslinked polymerization products have at least two glass transition temperatures, of which at least one is not higher than +15° C., and which differ from one another by at least 15° C.

6. Block copolymers according to claim 5, having the structural formula

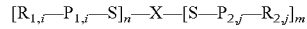

where i is a number from 1 to n and j is a number from 1 to m, and n and m are each integers,
    where $P_{1,i}$ are polymer segments from a monomer group comprising first monomers A and/or copolymer segments from a monomer group comprising first monomers A and third monomers C,
    where the i segments $P_1$ can have different lengths and different chemical compositions,
    where $P_{2,j}$ are polymer segments from a monomer group comprising second monomers B and/or copolymer segments from a monomer group comprising second monomers B and third monomers C,
    where the j segments $P_2$ can have different lengths and different chemical compositions,
    with the proviso that at least one of the segments $P_{1,i}$ and/or $P_{2,j}$ contains copolymerized monomers C,
    $R_{1,i}$ and $R_{2,j}$ are radicals capping the segments $P_{1,i}$ and $P_{2,j}$, where additionally X is a linking unit, with $X(S)_{n+m}$ being a polyvalent thioether unit, the valency being at least n+m, wherein the monomers C contain the functional groups which on irradiation with ultraviolet rays initiate a UV crosslinking.

7. Block copolymers according to claim 6, wherein the weight-average molecular weight $M_w$ is between 2000 and 4 000 000, and/or the weight-average molecular weight $M_w$ of the segments $P_1$ and/or $P_2$ is between 1000 and 2 000 000.

8. Block copolymers according to claim 6, wherein the polymer blocks $P_{1,i}$ and $P_{2,j}$ are not homogeneously miscible with one another at room temperature (RT).

9. Block copolymers according to claim 6, wherein the polymer blocks $P_{1,i}$ and $P_{2,j}$ are not homogeneously miscible with one another at room temperature (RT).

10. Block copolymers according claim 5, wherein said monomers containing functional groups which upon irradiation with ultraviolet rays initiate a UV crosslinking are selected from the group consisting of photoinitiators having a copolymerizable double bond.

11. Block copolymers according to claim 10, wherein said photoinitiators having a copolymerizable double bond are selected from the group consisting of Norrish-I photoinitiators and Norrish-II photoinitiators.

12. Block copolymers according to claim 11, wherein said photoinitiator is/are benzoin acrylate and/or acrylated benzophenones.

13. Pressure-sensitive adhesive comprising a block copolymer of claim 5.

* * * * *